(12) United States Patent
Bocciardo et al.

(10) Patent No.: US 10,335,733 B2
(45) Date of Patent: Jul. 2, 2019

(54) GAS SEPARATION PROCESS

(71) Applicants: Fujifilm Manufacturing Europe B.V., Tilburg (NL); Fujifilm Corporation, Tokyo (JP)

(72) Inventors: Davide Bocciardo, Tilburg (NL); Yujiro Itami, Tilburg (NL)

(73) Assignees: Fujifilm Manufacturing Europe B.V., Tilburg (NL); Fujifilm Corporation, Tokyo (JP)

( * ) Notice: Subject to any disclaimer, the term of this patent is extended or adjusted under 35 U.S.C. 154(b) by 217 days.

(21) Appl. No.: 15/270,372

(22) Filed: Sep. 20, 2016

(65) Prior Publication Data
US 2017/0080380 A1 Mar. 23, 2017

Related U.S. Application Data

(60) Provisional application No. 62/221,332, filed on Sep. 21, 2015.

(51) Int. Cl.
*B01D 53/22* (2006.01)
*B01D 63/10* (2006.01)
(Continued)

(52) U.S. Cl.
CPC .......... *B01D 53/226* (2013.01); *B01D 53/228* (2013.01); *B01D 63/10* (2013.01); *B01D 69/02* (2013.01); *B01D 71/64* (2013.01); *B01D 2256/245* (2013.01); *B01D 2257/304* (2013.01); *B01D 2257/504* (2013.01); *B01D 2317/022* (2013.01); *B01D 2317/08* (2013.01); *B01D 2325/14* (2013.01); *B01D 2325/20* (2013.01); *Y02C 10/10* (2013.01)

(58) Field of Classification Search
CPC ................ B01D 71/64; B01D 2325/20; B01D 2317/022; B01D 69/02; B01D 53/228; B01D 2325/14; B01D 2317/08; B01D 63/10; B01D 2257/304; B01D 2257/504; B01D 2256/245; Y02C 10/10
See application file for complete search history.

(56) References Cited

U.S. PATENT DOCUMENTS

| 4,717,394 | A | * | 1/1988 | Hayes | .................... | B01D 71/64 |
| | | | | | | 210/500.39 |
| 5,085,676 | A | * | 2/1992 | Ekiner | .................. | B01D 69/08 |
| | | | | | | 210/500.23 |

(Continued)

OTHER PUBLICATIONS

DOE "Wabash River Coal Gasification Repowering Project: A DOE Assessment" 2002, 42 pages, https://www.osti.gov/serylets/purl/790376.*

(Continued)

*Primary Examiner* — Anthony R Shumate
(74) *Attorney, Agent, or Firm* — Banner & Witcoff, Ltd.

(57) ABSTRACT

A process for separating a feed gas comprising polar and non-polar gases into a gas mixture enriched in polar gas(es) and a gas mixture depleted in polar gas(es), the process comprising passing the feed gas through a gas separation unit comprising at least two gas-separation modules in order of increasing selectivity for the polar gas(es), wherein the feed gas entering the gas separation unit comprises more than 35 mol % and up to 90 mol % of polar gas(es).

18 Claims, 3 Drawing Sheets

(51) Int. Cl.
*B01D 69/02* (2006.01)
*B01D 71/64* (2006.01)

(56) References Cited

U.S. PATENT DOCUMENTS

| | | | | |
|---|---|---|---|---|
| 5,248,319 | A * | 9/1993 | Ekiner | B01D 71/64 |
| | | | | 95/54 |
| 5,286,280 | A * | 2/1994 | Chiou | B01D 53/228 |
| | | | | 427/412.1 |
| 5,538,536 | A | 7/1996 | Fuentes et al. | |
| 6,361,582 | B1 * | 3/2002 | Pinnau | B01D 71/52 |
| | | | | 95/45 |
| 2002/0053284 | A1 * | 5/2002 | Koros | B01D 53/228 |
| | | | | 95/51 |
| 2002/0124722 | A1 * | 9/2002 | Baker | B01D 53/228 |
| | | | | 95/45 |
| 2003/0089227 | A1 * | 5/2003 | Hasse | B01D 53/228 |
| | | | | 95/45 |
| 2004/0000513 | A1 * | 1/2004 | Colling | B01D 53/225 |
| | | | | 210/323.1 |
| 2015/0321140 | A1 * | 11/2015 | Lee | C08F 6/12 |
| | | | | 521/131 |
| 2017/0226438 | A1 * | 8/2017 | Peters | C10L 3/103 |

OTHER PUBLICATIONS

Perry's "Perry's Chemical Engineers Handbook" 8th Ed. McGraw-Hill 1999, p. 22-40,22-41.*

* cited by examiner

*Fig. 1 (prior art)*
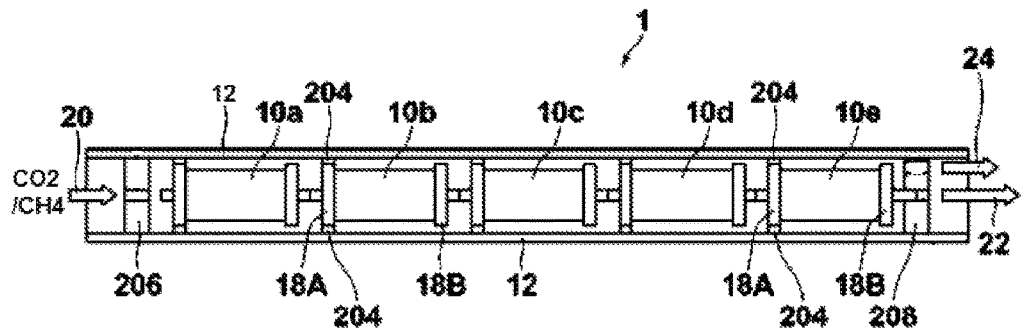
*Fig. 2 (invention)*
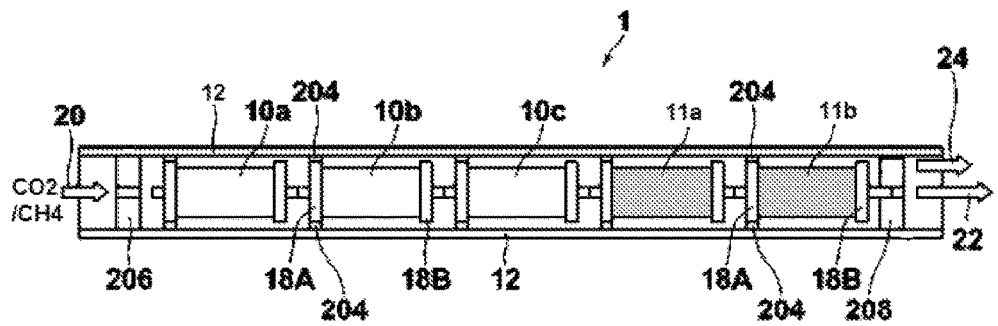

GAS SEPARATION PROCESS

This invention relates to a process for separating a feed gas comprising non-polar and polar gases into a gas mixture enriched in polar gases and a gas mixture depleted in polar gases.

It is known to separate gas mixtures into a gas mixture enriched in one of the components and a gas mixture depleted in that component using a gas separation unit comprising gas-separation modules. One such gas separation unit comprising modules is described in Japanese patent publication No. 2014-161744 of FUJIFILM Corporation and is illustrated in FIG. 1.

Typically gas-separation units comprise a number of identical gas-separation modules connected in series and contained in a housing, as illustrated in FIG. 1. Each gas-separation module comprises a gas-selective membrane which separates gas into a permeate which passes through the membrane and a retentate which does not pass through that membrane. The retentate from each module becomes the feed gas for the next module in the direction of gas flow. The housing typically has a feed inlet, an outlet for the retentate which has passed through all of the modules and one or more permeate outlets. The inlets and outlets are usually located on a side wall of the housing near opposite ends of the unit or on an end wall of the unit.

There is a need for an improved process for separating mixtures comprising non-polar and polar gases into a gas mixture enriched in polar gases and a gas mixture depleted in polar gases. In particular, it is desirable to remove as much polar gas(es) (e.g. $CO_2$ and/or $H_2S$) as possible from gas mixtures comprising non-polar gas(es) (e.g. $CH_4$) and large amounts of polar gases (e.g. $CO_2$ and/or $H_2S$) in a quick and selective manner.

According to the present invention there is provided a process for separating a feed gas comprising polar and non-polar gases into a gas mixture enriched in polar gas(es) and a gas mixture depleted in polar gas(es), the process comprising passing the feed gas through a gas separation unit comprising at least two gas-separation modules in order of increasing selectivity for the polar gas(es), wherein the feed gas entering the gas separation unit comprises more than 35 mol % and up to 90 mol % of polar gas(es).

The term "comprising" is to be interpreted as specifying the presence of the stated parts, steps or components, but does not exclude the presence of one or more additional parts, steps or components.

Reference to an element by the indefinite article "a" or "an" does not exclude the possibility that more than one of the element(s) is present, unless the context clearly requires that there be one and only one of the elements. The indefinite article "a" or "an" thus usually means "at least one".

As will be understood, "enriched" and "depleted" are relative to the feed gas which enters the gas separation unit.

BRIEF DESCRIPTION OF THE DRAWINGS

FIG. 1 is a sectional view of the gas-separation unit known from Japanese patent publication No. 2014-161744.

FIG. 2 is a sectional view of a gas-separation unit used in the process of the present invention.

FIG. 1 illustrates the gas separation unit known from Japanese patent publication No. 2014-161744 and its use. A feed gas (20) comprising $CO_2$ (a polar gas) and $CH_4$ (a non-polar gas) enters the gas separation unit (1) via baffle (206). The gas separation unit (1) comprises a housing (12) of circular cross section and a series of identical gas-separation modules (10a), (10b), (10c), (10d) and (10e) connected in series via a central pipe (often referred to as a permeate collection tube). Each module comprises end plates (18A) and (18B) and a gas-tight seal (204) which prevents gas from passing to the next module without first passing over a spiral-wound gas separation membrane contained within the module (not shown). Thus the gas-tight seals (204) ensure that the retentate from each module except for the final module is the feed gas for the next module. The modules each contain a permeate collection tube into which gas which has permeated through the membrane may flow. Then the permeate gas (22) from the modules (10a) to (10e) exits the gas separation unit (1) through the permeate collection tube and retentate gas (24) exits gas separation unit (1) through perforated end plate (208).

FIG. 2 is identical to FIG. 1 except that the gas separation unit (1) comprises a first set of gas-separation modules (10a), (10b) and (10c) and a second set of gas-separation modules (11a) and (11b), wherein each of the gas-separation modules in the second set of gas-separation modules (11a) and (11b) have a higher selectivity for polar gas(es) than the gas-separation modules (10a), (10b) and (10c) in the first set of gas-separation modules.

FIG. 3 illustrates a gas-separation module (10) of the type typically used in the gas-separation unit. A feed gas (20) comprising polar gas(es) (e.g. $CO_2$ and/or $H_2S$) and non-polar gas (e.g. $CH_4$) enters the gas-separation module at one end but is unable to enter the permeate collection tube (14). The feed gas (20) flows through the module where it contacts a gas separation membrane amongst the various sheet layers present in the gas-separation module. Feed gas (20) which permeates through the gas separation membrane enters the permeate collection tube (12) through perforations (12A) and flows through the central permeate collection tube (12) and exits as permeate gas (22) for collection. Feed gas (20) which is retained by the membrane (i.e. which does not permeate through the gas separation membrane) is unable to enter the permeate collection tube (12) and exits as retentate gas (24) to either become feed gas for the next gas-separation module or to exit the gas separation unit.

Figure 3:
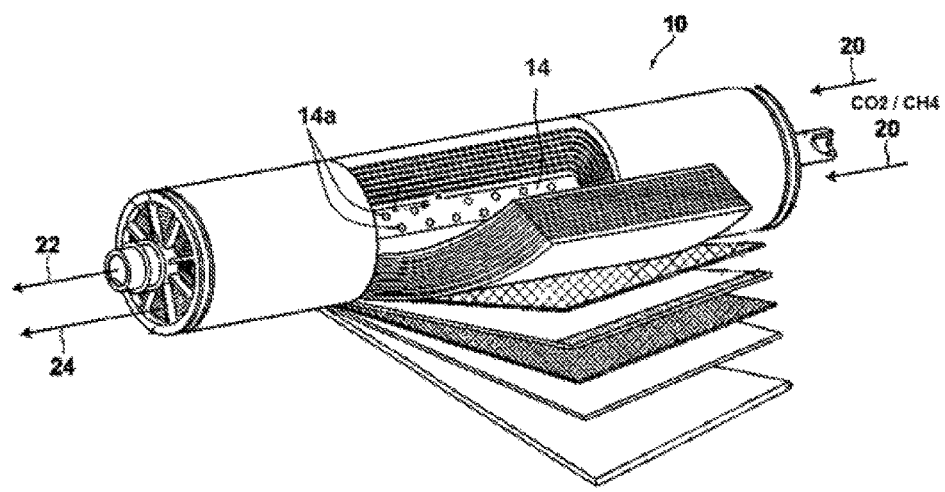
FIG. 3 is a partial sectional view of a gas-separation module used in the process of the present invention.

For convenience and space efficiency reasons, it is desirable to pack a large membrane area into a small volume. One technique for packing a large membrane area into a small volume is to wind a membrane envelope spirally around a perforated permeate collection tube (12) to create a wound membrane structure referred to as a 'module', as illustrated in FIG. 3.

The modules (10) typically comprise alternate membrane envelopes and permeation envelopes wound onto the central permeate collection tube (14). The permeate envelopes are rectangular and are closed on three sides and open one side. The open side of the permeation envelopes are glued to the permeate collection tube (14) such that gas which passes through the membrane envelope and into the permeate membrane can travel through holes (14A) and into the permeate collection tube (14). In contrast, a closed side of the membrane envelop is glued to the permeate collection tube and the open sides of membrane envelop is configured to allow feed gas to enter the membrane envelope. The membrane envelopes, permeation envelopes and central permeation tube are therefore configured such that gas entering the module can only gain entry to the permeate collection tube (14) by passing through the selective membrane in the membrane envelope and into the permeation envelope having its open side adhered to the gas separation tube and in gas communication therewith via the perforations (14A).

Figure 4:
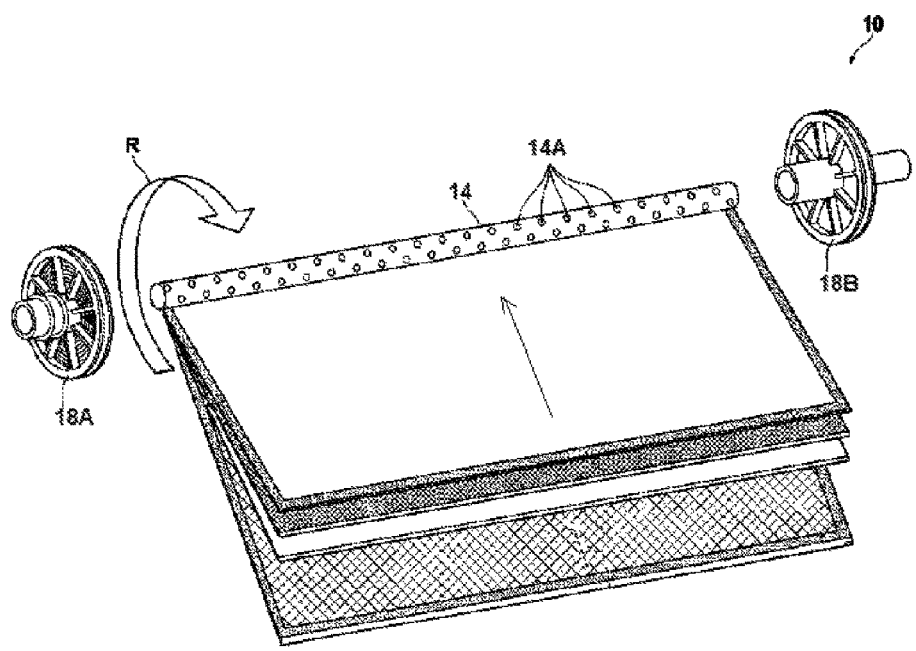
FIG. 4 illustrates part of a process for making gas-separation modules of the type shown in FIG. 3.

The modules (10) may be made by the process illustrated in FIG. 4 where the alternate membrane envelopes and permeation envelopes are wound onto the central permeate collection tube (14) by rotating the tube in the direction indicated by curved arrow R. The open edge of the permeation membrane is glued to the gas permeate tube (14) so that gas may pass through perforations (14A) and into the tube (14). The envelopes are held in position and prevented from unwinding by end plates (18A) and (18B).

Modules are placed in a housing which can withstand high pressures to give what is known as a gas-separation unit (1) and illustrated in FIG. 1. The modules are typically cylindrical and comprise two flat, circular parallel end faces (one at each end) and a curved face of circular cross-section joining them. Feed spacers are often included in the membrane envelopes to space the membranes apart and give the feed gas free access to the membrane surface. Permeate spacers are typically provided between the membrane envelopes to guide gas which has permeated through the wound membrane envelope(s) to a permeate collection tube. The envelopes therefore typically comprise outer membrane sheets and an inner feed spacer, e.g. a screen which creates space between the membranes through which feed gas may flow freely.

Large gas treatment plants often use modular banks or skids of gas-separation units in order to save money on the cost of valves and piping. High pressure piping and valves required for feeding gas-separation units are relatively more expensive than the lower-pressure conduits employed for the permeate and reject gas streams, and provision of gas-separation units comprising many modules reduces the overall number of required pipe connections.

The housing of each gas-separation unit contains the modules (e.g. spiral wound modules) and as gas passes through the length of each module a portion of the gas permeates through the membranes of the modules and is collected in permeate collection tube. The flow volume and flow velocity of the feed stream progressively fall with downstream position, and the concentration of target gas in the remaining feed gas progressively decreases after passage along each module due to passage of the target gas through the membranes and into the permeate stream inside the permeate collection tube.

The feed gas comprising non-polar gas(es) and polar gas(es) enters at one end of the housing, at a high rate of flow, and travels along the length of the inside of the housing contacting one side of each module (e.g. either the inside or the outside of the module). The portion of the feed gas which does not permeate through the membranes of the modules exits the unit at the opposite end of the housing as a retentate stream which has a lower content of the target gas than the initial feed stream.

The housing is preferably a cylindrical, tube-like structure of standardized diameter and may be configured for large modular installations comprising many banks or rows of gas-separation units, each unit holding many modules.

Such gas-separation units may comprise plug-type closures or end caps that may be removed to provide "full-bore" access to the interior of the housing for installation or replacement of the modules. The modules typically have a cylindrical design with simple end seals to enable long chains or strings of modules to be connected in series. This facilitates the loading and unloading of modules into the unit, and simplifies the construction of large capacity gas-separation plants.

The modules optionally comprise couplings, for example, an end flange, typically with O-ring seals, that can be used to join or snap-fit modules together in series.

An anti-telescope unit typically is placed at each module to support and absorb axially-directed forces carried by the module shell.

In the gas-separation units of Japanese patent publication No. 2014-161744 only one type of module is used having one specific selectivity for a certain gas mixture at same temperature.

Many of the currently available gas-separation units provide good $CO_2/CH_4$ selectivity but have poor $CO_2$ permeance, leading to a slow separation process. The 'permeance' of a membrane is the membrane's permeability to a particular gas divided by its thickness. Typically permeance is expressed in gas permeance units ("GPU") and can be contrasted with permeability which is a measure of flow rate through a membrane regardless of the membrane's thickness.

When membranes having high polar gas permeance are used in gas-separation units the increased polar gas flux rate through the membrane typically results in a significant reduction in non-polar gas/polar gas selectivity. On the other hand, when membranes having high non-polar gas/polar gas selectivity are used in gas-separation units the polar gas flux rate and therefore permeance typically reduce significantly. There is a need for a process which can provide both good non-polar gas/polar gas selectivity and good polar gas permeance. Surprisingly the present invention achieves both good non-polar gas/polar gas selectivity and good polar gas permeance.

The gas-separation unit comprises at least 2 modules, more preferably at least 4 modules, especially at least 7 modules. The maximum number of modules is not particularly limited, but for practical purposes the number of modules in each housing is preferably less than 20, more preferably less than 15. A typical housing will contain 8 modules.

The gas-separation module(s) having higher selectivity for the polar gas(es) preferably have higher selectivity for at least one, more preferably for at least half, especially for all of the polar gas(es) present in the feed gas.

As examples of non-polar gases there may be mentioned $CH_4$, ethane, propane and mixtures comprising two or more thereof. The non-polar gas(es) preferably is or comprises $CH_4$.

As examples of polar gases there may be mentioned $H_2S$, $CO_2$ and mixtures comprising two or more thereof. The polar gas(es) preferably is or comprises $H_2S$ and/or $CO_2$, especially $CO_2$.

Preferably the non-polar gas(es) are or comprise $CH_4$ and the polar gas(es) are or comprise $CO_2$ and/or $H_2S$.

The modules may be connected in series, e.g. a single row of modules or multiple rows of modules in parallel, with each row comprising modules connected in series.

Usually two or more of the gas-separation modules may be connected in series such that permeate gas which passes through each of the modules other than the final module is fed into the permeate collection tube of the next module.

The feed flow rates at the entrance of the housing are preferably in the range of 0.5-1.5 MMSCFD (million standard cubic feet of gas flow per day).

The typical feed of $CO_2$ molar fractions in the gas mixtures to be separated are in the range 40%-90% with inlet pressures of 10-150 bar.

Preferred gas-separation modules are spiral-wound gas-separation modules, e.g. comprising a permeate collection tube and a membrane envelope wound spirally around the tube to provide a gas-separation module comprising two flat end faces.

Typically the modules comprise a curved wall of circular cross-section, in addition to the end faces, which wall meets the two end faces. For example the module may have a generally cylindrical shape comprising the two (circular) end faces and a wall (e.g. of circular cross-section) joining the two end faces together. The flat end faces may comprise some surface texture e.g. caused by the edges of the membranes wound spirally around the permeate collection tube.

The function of the permeate collection tube (or "tube" for short) is to collect the permeate gas which has passed through the membranes. The tube typically comprises perforations which allow permeate gas to flow from the exterior of tube to the interior. The perforations are located in the tube such that retentate gas cannot enter the tube.

Thus the membrane envelopes are preferably arranged such that the permeate can flow through perforations and into the tube and the retentate cannot flow through the perforations.

The tube is typically constructed of a rigid material, for example a metal (e.g. stainless steel) or a plastics material. One will usually select a material which is stable to the permeate gas(es).

The tube may have any cross sectional profile, e.g. triangular, square, pentagonal, hexagonal, elliptical or circular, with circular being preferred. Tubes having a circular cross-sectional profile are useful for providing cylindrical wound membrane structures, e.g. comprising two parallel end faces and a third face which has a circular cross-section and joins with the two end faces.

The membrane envelope typically comprises outer membrane sheets and an inner feed spacer. The membrane sheets are usually rectangular and have two long edges and two short edges. Rectangular membrane sheets may be folded in two at the centre, and the feed spacer is located inside the fold, typically against the inside short edge.

The module preferably comprises more than one membrane envelope, e.g. 2 to 100, especially 20 to 50 membrane envelopes.

Typically the membrane sheets comprise composite membranes, e.g. comprising a discriminating layer and a porous support. The function of the discriminating layer is to preferentially discriminate between gases, separating a feed gas mixture into a permeate which passes through the membrane and a retentate which does not pass through the membrane. The permeate and retentate typically comprise the same gases as the feed gas mixture, but one is enriched in at least one of the gases present in the feed gas and the other is depleted in that same gas.

The porous support is typically open pored, relative to the discriminating layer. The porous support may be, for example, a microporous organic or inorganic membrane, or a woven or non-woven fabric. The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

The porous support preferably has an average thickness of 20 to 500 µm, preferably 50 to 400 µm, especially 100 to 300 µm.

One may use an ultrafiltration membrane as the porous support, e.g. a polysulfone ultrafiltration membrane, cellulosic ultrafiltration membrane, polytetrafluoroethylene ultrafiltration membrane, polyvinylidenefluoride ultrafiltration membrane and especially polyacrylonitrile ultrafiltration membrane. Asymmetric ultrafiltration membranes may be used, including those comprising a porous polymer membrane (preferably of thickness 10 to 150 µm, more preferably 20 to 100 µm) and optionally a woven or non-woven fabric support. The porous support is preferably as thin as possible, provided it retains the desired structural strength.

Typically the discriminating layer is present on one side of the porous support or is partially or wholly within the porous support.

Preferred discriminating layers comprise a polyimide, especially a polyimide having —$CF_3$ groups and optionally carboxylic acid groups. Polyimides comprising $CF_3$ groups may be prepared by, for example, the general methods described in U.S. Pat. Reissue No. 30,351 (based on U.S. Pat. No. 3,899,309) U.S. Pat. Nos. 4,717,394 and 5,085,676. Typically one or more aromatic dianhydrides, preferably having —$CF_3$ groups, are condensed with one or more diamines. The diamine(s) and dianhydride(s) copolymerise to form an AB-type copolymer having alternating groups derived from the diamine(s) and dianhydride(s) respectively.

Preferably the discriminating layer comprises groups of the Formula (1) wherein Ar is an aromatic group and R is a carboxylic acid group, a sulphonic acid group, a hydroxyl group, a thiol group, an epoxy group or an oxetane group:

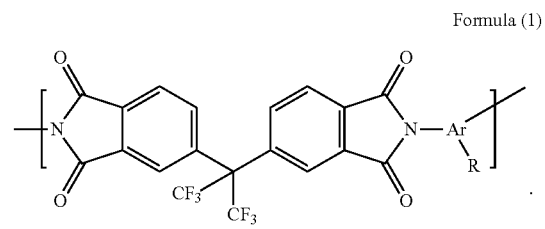

Formula (1)

Preferably the discriminating comprises further a polyimide comprising groups as shown in formula (2) wherein n and y are varied between 0 and 100%. The higher the y is in percentage versus the n the higher the PI-polymer is in selectivity and the lower in flux (permeance) for a gas mixture comprising non-polar and polar gases.

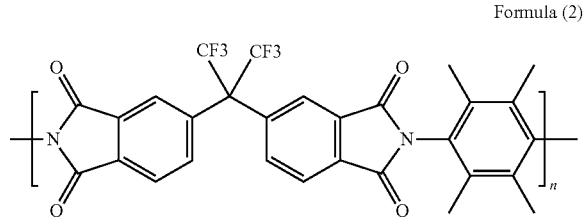

Formula (2)

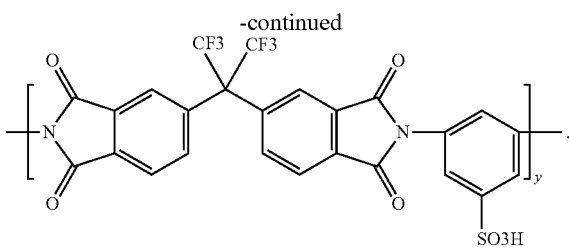

Optionally there may be a polymeric layer between the porous support and the discriminating layer, often referred to as a gutter layer. Preferred gutter layers comprise a dialkylsiloxane.

The feed spacer is preferably a screen, e.g. having a large mesh size to allow the feed gas to travel axially along membrane module. In most instances, the feed spacer will be utilized, but it is possible to construct a module without this component. In general, a feed spacer is formed of any inert material which maintains a space between the membranes.

After the membrane module has been wound, the resultant wound membrane structure may be held in a wound state through the use of restraining bands, outer wraps, an anti-telescoping device (ATD) secured to the permeate collection tube or a combination of two or more thereof. A preferred method of restraining the wound membrane structure (in addition to using an ATD) is by filament winding, in which a glass fibre filament dipped in an epoxy resin is wound around the wound membrane structure and cured. The wound membrane structure can then be loaded into the housing and optionally connected to further modules.

In operation, the feed gas is typically introduced through the gas inlet at one end of the gas-separation unit and contacts a perforated baffle (206). The baffle modifies and evens-out the gas flow, which then contacts the first gas-separation module. The feed gas travels axially through the housing, along the module and into the feed spacer. As the feed gas encounters the gas-separation module, part of the feed gas (or permeate) passes through the membrane and into the permeate envelope. After the permeate passes through the membrane, it travels along the permeate carrier, eventually passing into permeate collection tube through openings in the tube. The permeate optionally exits the module through a permeate outlet and the retentate travels axially through the housing and eventually exist the housing through a retentate outlet.

The target gas may be non-polar gas(es) (e.g. $CH_4$) or polar gas(es) (e.g. $CO_2$ and/or $H_2S$). Recently the separation and capture of polar gases, especially $CO_2$, has attracted attention in relation to environmental issues (global warming).

Typically the feed gas is passed through a first set of gas-separation modules and then through a second set of gas-separation modules, wherein each of the gas-separation modules in the second set of gas-separation modules has a higher polar gas selectivity than the gas-separation modules in the first set of gas-separation modules, especially higher $CO_2$ and/or $H_2S$ selectivity. The first and the second set of gas-separation modules preferably each comprises at least two or three gas-separation modules.

Preferably all of the gas-separation modules in the first set of gas-separation modules comprise gas separation membranes having an αpolar gas/non-polar gas (e.g. $αCO_2/CH_4$) of 5 to 25 and all of the gas-separation modules in the second set of gas-separation modules comprise gas separation membranes having an αpolar gas/non-polar gas (e.g. $αCO_2/CH_4$) of 20 to 50. The polar gas/non-polar gas selectivity is measured at the conditions of each experiment which will be discussed in the following paragraphs.

In a preferred embodiment:
(i) the gas-separation modules of the first set of gas-separation modules have identical polar gas/non-polar gas selectivity to each other;
(ii) the gas-separation modules of the second set of gas-separation modules have identical polar gas/non-polar gas selectivity to each other; and
(iii) the gas-separation modules of the second set of gas-separation modules have higher polar gas/non-polar gas selectivity than the gas-separation modules of the first set of gas-separation modules.

Preferably the feed gas enters the first gas-separation module at a temperature below 60° C.

Typically the gas-separation modules form part of a gas separation unit, the gas separation unit further comprising a housing which contains the gas separation modules, the gas separation modules are connected in series and the housing further comprises a gas inlet and at least two gas outlets.

In a preferred embodiment the gas separation unit is free from temperature controlling devices and gas pressure controlling devices. In this way the cost of the gas separation is reduced and so are the maintenance requirements and potential for mechanical failure.

Preferably the feed gas is fed into the first of the gas-separation modules at a pressure of 5 to 80 bar, more preferably 10 to 70 bar and especially 20 to 60 bar.

Preferably the feed gas is fed into the first of the gas-separation modules at a flow rate of 0.1 to 2 million standard cubic feet per day ("MMSCFD"), more preferably 0.5 to 2 MMSCFD and especially 0.5 to 1.5 MMSCFD. Preferably the feed gas is fed into the first of the gas-separation modules at a temperature of 20 to 60° C., more preferably 30 to 55° C. and especially 30 to 50° C.

In a preferred embodiment the gas separation unit comprises a series of modules not all of which have the same polar gas/non-polar gas selectivity, each module comprising a gas-selective membrane which separates gas into a permeate which passes through the membrane and a retentate which does not pass through that membrane, wherein gas flows through the unit such that retentate from each module except for the final module becomes the feed gas for the next module and wherein the gas-separation modules are arranged such that the polar gas selectivity of the first module through which the gas flows is lower than the polar gas selectivity of the final module through which the gas flows.

Preferably the feed gas entering the gas separation unit comprises 40 to 90 mol % of polar gas(es).

The series of modules preferably comprises a first set of gas-separation modules and a second set of gas-separation modules, wherein each of the gas-separation modules in the second set of gas-separation modules has a higher polar gas selectivity than all of the gas-separation modules in the first set of gas-separation modules and wherein the gas separation unit and the modules are arranged such that the retentate from each module except for the final module is the feed gas for the next module.

The invention is further illustrated by the following Examples.

EXAMPLES AND COMPARATIVE EXAMPLES

The following materials were used to prepare the membranes sheets:

PAN is a porous support polyacrylonitrile L10 ultrafiltration membrane from GMT Membrantechnik GmbH, Germany.

PET is HW 2503 polyester and epoxy resin 75:25% from Hornwood.

UV9300 is SilForce™ UV9300 from Momentive Performance Materials Holdings. This is thermally curable copolymer comprising at least 3 epoxy groups and linear polydimethyl siloxane chains. Furthermore, this copolymer cures rapidly when irradiated with UV light in the presence of a photo-initiator.

I0591 is 4-isopropyl-4'-methyldiphenyliodonium tetrakis (pentafluorophenyl) borate ($C_{40}H_{18}BF_{20}I$) from TCI (a photo-initiator which is free from mono-epoxy compounds).

$Ti(OiPr)_4$ is titanium (IV) isopropoxide from Dorf Ketal Chemicals.

n-Heptane is n-heptane from Brenntag Nederland BV.

MEK is 2-butanone from Brenntag Nederland BV.

CH is cyclohexanone from Brenntag Nederland BV.

PI1 is $(6FDA-TeMPD)_n$-$(6FDA-DAB)_y$ of the following structure, wherein n is 20% and y is 80% (% being % mol/mol) obtained from FUJIFILM Corporation:

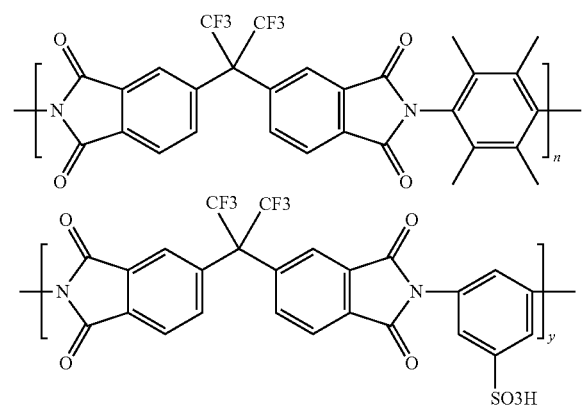

PI2 is as defined above for PI1 except that n is 80% and y is 20% (% being % mol/mol), obtained from FUJIFILM Corporation.

PE Interfoil is Mylar™ A50, obtained from Dupont (a gas-impermeable polyester sheet of 50 μm thickness.

PP is Naltex 1717_90 Polypropylene.

Preparation of Membranes

Stage a) Preparation of a Partially Cured Polymer 1 ("PCP Polymer 1")

A solution of a PCP Polymer 1 was prepared by heating the components described in Table 1 together for 105 hours at 95° C. The resultant solution of PCP Polymer 1 had a viscosity of about 64,300 mPa·s when measured at 25° C.

TABLE 1

Ingredients used to prepare PCP Polymer 1

| Ingredient | Amount (w/w %) |
|---|---|
| UV9300 | 75 |
| Ti(OiPr)$_4$ | 1.5 |
| n-Heptane | 23.5 |

Stage b) Preparation of Radiation Curable Composition 1 ("RCC1")

Portions of the solution of PCP Polymer 1 obtained in stage a) above were cooled to 20° C., diluted with n-heptane and then filtered through a filter paper having an average pore size of 2.7 μm. The remaining ingredients indicated in Table 2 below were added to make RCC1 having the formulation described in Table 2 below.

TABLE 2

| Ingredient Type | Ingredient | RCC1 |
|---|---|---|
| Inert solvent | n-Heptane (w/w %) | 84.9 |
|  | MEK (w/w %) | 1.6 |
| PCP Polymer | PCP Polymer 1 (w/w %) | 13.3 |
| Photo-initiator | I0591 (w/w %) | 0.2 |

Stage c) Preparation of Compositions Used to Form a Discriminating Layer

Compositions DSL1 up to DSL2 were prepared by mixing the components shown in Table 3 and filtering the mixtures through a filter paper having an average pore size of 2.7 μm.

TABLE 3

Ingredients used to prepare Discriminating layers DSL1 and DSL2

|  | DSL1 | DSL2 |
|---|---|---|
| PI1 (w/w %) | 2.0 | — |
| PI2 (w/w %) | — | 2.0 |
| CH (w/w %) | 6.0 | 6.0 |
| MEK (w/w %) | 92.0 | 92.0 |

Stage d) Preparation of Membrane 1 or Membrane 2

Membrane 1 and 2 were prepared having the layers described in Table 4 below.

The radiation-curable composition RCC1 was applied to a PAN substrate (step a)) at a speed of 10 m/min by a meniscus dip coating. The composition was then cured by irradiating (step b)) using a Light Hammer LH10 from Fusion UV Systems fitted with a D-bulb at an intensity of 16.8 kW/m (70%) to give a substrate carrying a gutter layer of 300 nm dry thickness. A discriminating layer was formed on the gutter layer using the compositions DSL1 for Membrane 1 up or DSL2 for Membrane 2 as indicated in Table 4, using a meniscus type coating T 10 m/min coating speed. The discriminating layer of Membrane 1 comprised PI1 and Membrane 2 comprised PI2.

TABLE 4

Membranes 1 and 2

| Example | Membrane 1 | Membrane 2 |
|---|---|---|
| Radiation-curable Composition | RCC1 | RCC1 |
| Coating speed (m/min) | 10 | 10 |
| Coating amount (ml/m$^2$) | 3 | 3 |
| Dry layer thickness of gutter layer (nm) | 300 | 300 |
| Discriminating layer composition | DSL1 | DSL2 |
| Coating amount (ml/m$^2$) | 8.4 | 8.4 |
| Dry layer thickness of discriminating layer (nm) | 120 | 120 |
| αCO$_2$/CH$_4$ | 30 | 15 |

Stage e) Preparation of Gas Separation Module 1 ("M1") Permeate Carrier Tube

A tube of internal diameter 47 mm and external diameter 50 mm, made from stainless steel Grade 316, was cut to a length of 1 m. Holes of diameter 4 mm were drilled through the tube wall to give an aperture ratio of 15% (i.e. the holes occupied 15% of the surface area of the permeate carrier tube.

(e1) Permeate Envelopes

A rectangular, gas-impermeable sheet made of PE interfoil (600 mm×600 mm) was sandwiched between two rectangular sheets of permeate carrier made of PET (900 mm×900 mm). The gas impermeable sheet was positioned at the centre of the short edge of the permeate carrier sheets and fixed there using an adhesive to give a permeate envelope. This was repeated a further 20 times to give 21 permeate envelopes, each comprising permeate carrier-gas-impermeable sheet-permeate carrier.

(e2) Membrane Envelopes

A rectangular sheet (900 mm×1,800 mm) of Membrane 1 was folded around a feed spacer sheet made of PP (900 mm×900 mm). The feed spacer sheet was positioned at the centre of the short edge, inside the fold of the membrane sheet and fixed there using an adhesive to give Membrane Envelope 1. This was repeated a further 21 times to give 22 Membrane Envelopes, each comprising Membrane 1-feed spacer-Membrane 1.

(e3) Preparation of Gas-separation Module (M1)

The membrane fold of a first membrane envelope (as described in (e2) above) was glued onto a permeate carrier tube. The long sides of a permeate envelope were then glued to the permeate carrier tube to form a gas-tight seal, with the permeate envelope (prepared as described in (e1) above). This process was repeated until all to 22 membrane envelopes and 21 permeate envelopes were adhered to the permeate carrier tube in an alternate manner. The envelopes were then wound spirally onto the permeate carrier tube in the manner illustrated in FIG. 4 and the envelopes were held in position and prevented from unwinding by end plates (18A) and (18B). This provided a cylindrical, gas-separation module comprising alternate membrane envelopes and permeate envelopes having two parallel, essentially circular end faces and an overall circular cross-sectional profile. Plastic bands were applied to the resultant module to prevent the wound envelopes from unwinding to give gas separation Module M1.

Stage f) Preparation of Gas Separation Module 2 ("M2")

Gas separation module 2 was prepared in exactly the same way as gas separation module 1 except that in place of Membrane 1 there was used Membrane 2.

Stage g) Preparation of Gas Separation Units

Gas separation units comprising gas-separation modules M1 and/or M2 in the order indicated in Table 5 were prepared by loading the modules in the desired order into a housing as illustrated in FIG. 1. Each housing comprised a feed gas inlet and gas outlets for permeate gas and retentate gas, located on the side wall of the housing as shown in FIG. 1.

The feed flows indicated in Table 5 were as measured one day after use of the relevant gas separation unit had begun.

In all experiments the temperature of the feed gas was 40° C. and the housing was not subjected to any extrinsic pressure or temperature control.

Gas Flux/Selectivity of the Membranes

A) Gas Flux

The flux of non-polar gas and polar gas through the composite membranes M1 and M2 were measured at 40° C. and gas feed pressure of 6000 kPa using a gas permeation cell with a measurement diameter of 3.0 cm and a feed gas composition of 13 v/v % polar gas ($CO_2$) and 87 v/v % non-polar gas ($CH_4$).

The flux of each gas was calculated based on the following equation:

$$Q_i = (\theta_{Perm} \cdot X_{Perm,i})/(A \cdot (P_{Feed} \cdot X_{Feed,i} - P_{Perm} \cdot X_{Perm,i}))$$

wherein:

$Q_i$=Flux of each gas (m$^3$(STP)/m$^2$·kPa·s)
$\theta_{Perm}$=Permeate flow (m$^3$(STP)/s)
$X_{Perm,i}$=Volume fraction of each gas in the permeate
A=Membrane area (m$^2$)
$P_{Feed}$=Feed gas pressure (kPa)
$X_{Feed,i}$=Volume fraction of each gas in the feed
$P_{perm}$=Permeate gas pressure (kPa)
STP is standard temperature and pressure, which is defined here as 25.0° C. and 1 atmosphere (101.325 kPa).

(B) Selectivity of the Membranes

The selectivity (αpolar gas/non-polar gas) for the composite membranes was calculated from $Q_{CO2}$ and $Q_{CH4}$ calculated above, based on following equation:

$$\alpha\text{polar gas/non-polar gas} = Q_{CO2}/Q_{CH4}$$

(C) Selectivity and Permeance of the Gas Separation Unit

The polar gas permeance (GPU) and αpolar gas/non-polar gas (selectivity) of the whole gas separation module configurations described in Table 5 were back-calculated from test data according to the formulation described in "Calculation Methods for Multicomponent Gas-separation by Permeation" (Y. Shindo et al., Separation Science and Technology, Vol. 20, Iss. 5-6, 1985). The membrane surface area of each module which used to calculate the permeance was 29 m$^2$. The feed pressure was varied and the mol % of $CO_2$ in the feed gas mixture was varied too as described in Table 5, where the inlet $CO_2$ partial pressure is also shown.

The mole % of polar gas and no-polar gas in the feed and permeate were measured by gas chromatography.

Selectivity (αpolar gas/non-polar gas) was calculated from $Q_{CO2}$ and $Q_{CH4}$ as described in (B) above.

TABLE 5

| Example | Total No. of modules | Configuration of the Modules (gas flowing left to right and M1 having higher polar gas selectivity than M2) | Gas feed pressure (bar) | Feed polar gas [mol $CO_2$/ mol mixture] | Feed polar gas partial pressure | Feed flow [MMSCFD] | Polar gas Permeance [GPU*] | apolar gas/non-polar gas (selectivity) |
|---|---|---|---|---|---|---|---|---|
| CEx1 | 8 | M2/M2/M2/M2/M2/M2/M2/M2 | 25 | 0.80 | 20 | 1.0 | 130 | 12 |
| CEx2 | 8 | M1/M1/M1/M1/M1/M1/M1/M1 | 25 | 0.80 | 20 | 1.0 | 70 | 27 |
| CEx3 | 8 | M1/M1/M2/M2/M2/M2/M2/M2 | 25 | 0.80 | 20 | 1.0 | 120 | 15 |
| Ex1 | 8 | M2/M2/M2/M2/M2/M2/M1/M1 | 25 | 0.80 | 20 | 1.0 | 121 | 19 |
| CEx4 | 7 | M2/M2/M2/M2/M2/M2/M2 | 40 | 0.50 | 20 | 1.0 | 105 | 15 |
| CEx5 | 7 | M1/M1/M1/M1/M1/M1/M1 | 40 | 0.50 | 20 | 1.0 | 72 | 27 |
| CEx6 | 7 | M1/M1/M1/M1/M1/M2/M2 | 40 | 0.50 | 20 | 1.0 | 89 | 21 |
| Ex2 | 7 | M2/M2/M1/M1/M1/M1/M1 | 40 | 0.50 | 20 | 1.0 | 90 | 25 |
| CEx7 | 6 | M1/M1/M1/M1/M1/M1 | 60 | 0.15 | 9 | 1.0 | 33 | 28 |

TABLE 5-continued

| Example | Total No. of modules | Configuration of the Modules (gas flowing left to right and M1 having higher polar gas selectivity than M2) | Gas feed pressure (bar) | Feed polar gas [mol CO$_2$/ mol mixture] | Feed polar gas partial pressure | Feed flow [MMSCFD] | Polar gas Permeance [GPU*] | apolar gas/non-polar gas (selectivity) |
|---|---|---|---|---|---|---|---|---|
| CEx8 | 6 | M2/M2/M2/M2/M2/M2 | 60 | 0.15 | 9 | 1.0 | 65 | 15 |
| CEx9 | 6 | M2/M2/M1/M1/M1/M1 | 60 | 0.15 | 9 | 1.0 | 45 | 23 |
| CEx10 | 6 | M1/M1/M1/M1/M2/M2 | 60 | 0.15 | 9 | 1.0 | 52 | 23 |

*GPU = 7.5 × 10$^{-9}$ Nm$^3$/m$^2$ · kPa · s.

The invention claimed is:

1. A process for separating a feed gas comprising polar and non-polar gases into a gas mixture enriched in polar gas(es) and a gas mixture depleted in polar gas(es), the process comprising passing the feed gas through a gas separation unit comprising at least two gas-separation modules in order of increasing selectivity for the polar gas(es), wherein (i) the feed gas entering the gas separation unit comprises more than 35 mol % and up to 90 mol % of polar gas(es); and (ii) each gas-separation module comprises a gas separation membrane; (iii) the feed gas is passed through a first set of gas-separation modules and then through a second set of gas-separation modules, wherein each of the gas-separation modules in the second set of gas-separation modules has a higher polar gas selectivity than all of the gas-separation modules in the first set of gas-separation modules; and (iv) all of the gas-separation modules in the first set of gas-separation modules comprise gas separation membranes having $\alpha CO_2/CH_4$ selectivity of 5 to 25 and all of the gas-separation modules in the second set of gas-separation modules comprise gas separation membranes having $\alpha CO_2/CH_4$ selectivity of 20 to 50.

2. The process according to claim 1 wherein the gas-separation modules of the first set of gas-separation modules have identical polar gas selectivity to each other.

3. The process according to claim 1 wherein the gas-separation modules of the second set of gas-separation modules have identical polar gas selectivity to each other.

4. The process according to claim 1 wherein the feed gas enters a first gas-separation module of the at least two gas-separation modules at a temperature below 60° C.

5. The process according to claim 1 wherein the gas-separation modules are spiral wound gas-separation modules.

6. The process according to claim 1 wherein the gas separation unit further comprises a housing which contains the gas separation modules, the gas separation modules are connected in series and wherein the housing further comprises a gas inlet and at least two gas outlets.

7. The process according to claim 6 wherein the gas separation unit is free from temperature controlling devices and gas pressure controlling devices.

8. The process according to claim 1 wherein the gas-separation modules comprise gas separation membranes having polyimide discriminating layers comprising —CF$_3$ groups and optionally carboxylic acid groups.

9. The process according to claim 1 wherein the feed gas is fed into a first of the at least two gas-separation modules at a pressure of 20 to 60 bar.

10. The process according to claim 1 wherein the feed gas is fed into a first of the at least two gas-separation modules at a flow rate of 0.5 to 1.5 MMSCFD.

11. The process according to claim 1 wherein the feed gas is fed into a first of the at least two gas-separation modules at a temperature of 30 to 50° C.

12. The process according to claim 1 wherein the gas separation unit comprises a series of modules not all of which have the same polar gas selectivity, each module comprising the gas separation membrane which separates gas into a permeate which passes through the gas separation membrane and a retentate which does not pass through that membrane, wherein gas flows through the gas separation unit such that retentate from each module except for a final module becomes the feed gas for the next module and wherein the gas-separation modules are arranged such that the polar gas selectivity of a first module through which the gas flows is lower than the polar gas selectivity of the final module through which the gas flows.

13. The process according to claim 12 wherein the series of modules comprises a first set of gas-separation modules and a second set of gas-separation modules, wherein each of the gas-separation modules in the second set of gas-separation modules has a higher polar gas selectivity than all of the gas-separation modules in the first set of gas-separation modules and wherein the gas separation unit and the gas-separation modules are arranged such that the retentate from each module except for the final module is the feed gas for the next module.

14. The process according to claim 1 wherein the non-polar gas(es) are or comprise CH$_4$ and the polar gas(es) are or comprise CO$_2$ and/or H$_2$S.

15. The process according to claim 1 wherein:
(i) the feed gas is passed through a first set of gas-separation modules and then through a second set of gas-separation modules, wherein each of the gas-separation modules in the second set of gas-separation modules has a higher polar gas selectivity than all of the gas-separation modules in the first set of gas-separation modules;
(ii) the feed gas enters the first gas-separation module at a temperature below 60° C.;
(iii) the feed gas is fed into the first of the gas-separation modules at a pressure of 20 to 60 bar;
(iv) the gas-separation modules of the first set of gas-separation modules have identical polar gas selectivity to each other; and
(v) the gas-separation modules of the second set of gas-separation modules have identical polar gas selectivity to each other.

16. The process according to claim 15 wherein each gas separation module comprises a spiral-wound gas separation membrane.

17. The process according to claim 1 wherein the feed gas entering the gas separation unit comprises more than 35 mol % and up to 90 mol % of CO2.

18. The process according to claim 1 wherein the gas separation unit comprises at least 7 modules.

* * * * *